US008744962B1

(12) United States Patent
Dennes et al.

(10) Patent No.: US 8,744,962 B1
(45) Date of Patent: *Jun. 3, 2014

(54) SYSTEMS AND METHODS FOR AUTOMATIC PAYMENT PLAN (71) Applicant: United Services Automobile Association (USAA), San Antonio, TX (US)

(72) Inventors: Jeff Dennes, San Antonio, TX (US); Randy Bear, San Antonio, TX (US); Patricia A. Loeffler, San Antonio, TX (US); Peter H. McKenna, San Antonio, TX (US); Lisa E. Schwartz, Helotes, TX (US); Christy L. Newburn, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,202

(22) Filed: Sep. 25, 2012

Related U.S. Application Data (63) Continuation of application No. 11/853,961, filed on Sep. 12, 2007, now Pat. No. 8,275,708.

(51) Int. Cl.
*G06Q 40/00* (2012.01)
*G06Q 20/00* (2012.01)

(52) U.S. Cl.
CPC ..................... *G06Q 20/00* (2013.01)
USPC .............................. 705/40; 705/35

(58) Field of Classification Search
CPC ................................... G06Q 20/00
USPC ........................................... 705/35
See application file for complete search history.

(56) References Cited

U.S. PATENT DOCUMENTS 5,930,764 A 7/1999 Melchione et al.
6,131,810 A 10/2000 Weiss et al.
(Continued)

FOREIGN PATENT DOCUMENTS

JP 2001319065 A * 11/2001

OTHER PUBLICATIONS

Calvanesea, Diego, et al. "Enterprise modeling and Data Warehousing in TELECOM ITALIA", Information Systems, 2006, vol. 31, www.elsevier.com/locate/infosys, 32 pgs.

(Continued)

*Primary Examiner* — William Rankins
(74) *Attorney, Agent, or Firm* — Brooks, Cameron & Huebsch, PLLC (57) ABSTRACT Funding source data, such as bank account information or credit card information, associated with a user is stored in an enterprise-wide database maintained by an institution, such as a financial services institution. The data in the enterprise-wide database may be accessible to entities associated with the institution upon the user's authorization. The user only has to provide the funding source data once and may then use that funding source to pay for any product, service, bill, etc. associated with any of the entities of the institution. A user may update funding source data once, and this updated funding source data may then be available to all the entities. After providing account details for the user's various funding sources, a user can assign any of the funding sources to a payment plan for any product or service in any entity of the institution.

19 Claims, 8 Drawing Sheets

(56) References Cited

U.S. PATENT DOCUMENTS

| | | |
|---|---|---|
| 6,295,536 B1 | 9/2001 | Sanne |
| 2002/0023051 A1 | 2/2002 | Kunzle et al. |
| 2003/0191711 A1 | 10/2003 | Jamison et al. |
| 2003/0233318 A1 | 12/2003 | King et al. |
| 2004/0111370 A1* | 6/2004 | Saylors et al. ............ 705/40 |
| 2004/0162773 A1 | 8/2004 | Del Rey et al. |
| 2005/0187865 A1 | 8/2005 | Grear et al. |
| 2006/0173779 A1 | 8/2006 | Bennett et al. |
| 2007/0027799 A1 | 2/2007 | Manelis et al. |
| 2007/0131758 A1* | 6/2007 | Mejias et al. ............ 235/379 |
| 2007/0162308 A1 | 7/2007 | Peters |
| 2008/0104199 A1* | 5/2008 | Kalaboukis ............ 709/217 |
| 2008/0126145 A1* | 5/2008 | Rackley, III et al. ........ 705/7 |

OTHER PUBLICATIONS

Falk, Martin, "ICT—Linked Firm Reorganisation and Productivity Gains", WIFO Working Papers, No. 216, Vienna, Austria, Jan. 2004, 46 pgs.

Gabriels, Xavier, "Enterprise Resource Planning System (ERPS): New opportunities for Management Accounting Systems (MAS)", University of Antwerp, Faculty of Applied Economics, UFSIA-RUCA, Prinsstrat 13, 2000 Antwerp, Jul. 2003, 57 pgs.

Yingjie, Jiang, "Critical Success Factors in ERP, Implementation in Finland", M.Sc. Thesis in Accounting, the Swedish School of Economics and Business Administration, 2005, 71 pgs.

Huuhtanen, Juha, "Critical Success Factors in Integration of E-Commerce and Financial Information Systems. Case: Elisa ShopIt—Virtual Store", M.Sc Thesis in Accounting, The Swedish School of Economics and Business Administration, 2004, 62 pgs.

* cited by examiner

410 — You have elected to allow Entity 1 to initiate electronic payments to and from Funding Source 1. You hereby agree to allow all other Entities associated with the Institution to have access to Funding Source 1. You certify that you are authorized to initiate payments by phone or personal computer on Funding Source 1.

430 — This authorization will remain in effect until:_______
Enter date as (xx/xx/xxxx) you wish authorization to cease.

By entering the last four digits of your Social Security Number below, and clicking the "I Agree" button, you are signing this document electronically just as if you physically signed a paper document and mailed it to the Institution.

Last four digits of your Social Security Number: _______

420 — I AGREE    I DO NOT AGREE

Automatic Payment Setup
    Billing statements will no longer be sent to you when automatic payments are set up. Your account information may be viewed online.

Bill Summary
0 Term Life Account # G993690   - Amount Due: $690.00 – Due Date: 9/15/07
0 Auto Insurance # A1279         - Amount Due: $412.00 – Due Date: 8/31/07
0 Credit Card Account # XX-9719 - Amount Due: $33.12  – Due Date: 9/1/07

Payment Type — 710
    0 Make a one time payment
    0 Set up automatic payments

720
Payment Frequency and Amount — 730
0 Monthly payments of $XX.XX
0 Quarterly payments of $XX.XX
0 Semi-Annual payments of $XX.XX
0 Annual payments of $XX.XX Date of Payment: <enter date, e.g., 1st, 15th, etc.> — 740

From Account: <select funding source> — 750

SYSTEMS AND METHODS FOR AUTOMATIC PAYMENT PLAN

CROSS-REFERENCE TO RELATED APPLICATIONS

This application is a Continuation Application of Ser. No. 11/853,961, filed Sep. 12, 2007, now U.S. Pat. No. 8,275,708, and is also related by subject matter to that disclosed in the following commonly assigned applications, the entirety of which are hereby incorporated by reference herein: U.S. patent application Ser. No. 11/853,950, filed Sep. 12, 2007, and U.S. patent application Ser. No. 11/853,954, filed Sep. 12, 2007 and each entitled "Systems And Methods For Automatic Payment Plan."

BACKGROUND

Each business entity of an institution, such as a financial services institution, maintains a separate set of data for a user, often in a separate data storage device associated only with that business entity. The data for a user that is maintained by one business entity is not accessible by the other business entities of the same institution, and is not shared with the other business entities of the same institution. Because of this, a user may often have to provide the same information, such as banking account information, separately to the various business entities of the same institution, which is time consuming, inefficient, and expensive for the user, the business entities, and the institution.

Additionally, some business entities associated with an institution are not integrated into the institution's web presence. For these business entities, the only channels of communication for a user are telephone or mail. This is inefficient and expensive, as it requires back office processing and handling by service representatives, and does not provide user self-service.

SUMMARY

Funding source data, such as bank account information or credit card information, associated with a user may be accessible to entities associated with an institution, such as a financial services institution, upon the user's authorization. The user only has to provide the funding source data once and may then use that funding source to pay for any product, service, bill, etc. associated with any of the entities of the institution. A user may update funding source data once, and this updated funding source data may then be available to all the entities. After providing account details for the various funding sources, a user can assign any of the funding sources to an automatic payment plan for any product or service in any entity of the institution. Examples of entities include insurance companies, banks, investment companies, etc.

A system maintained by an institution may have an enterprise-wide database that contains user information that had been previously received and stored, e.g., with respect to a user's banking accounts or other funding sources. The enterprise-wide database may be accessible by each of the entities, and may store user data, such as identifiers and banking data, for example, associated with various user accounts. The user data may include data relating to institutional funding sources and data relating to external funding sources. Example funding sources include bank accounts, retirement accounts, brokerage accounts, and investment accounts. Institutional funding sources may be one or more accounts maintained by the institution, and external funding sources may be one or more accounts maintained by a third party that is not associated with the institution. The entities may request and receive payments for a product or service provided to a user, for example, using data stored in the enterprise-wide database.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
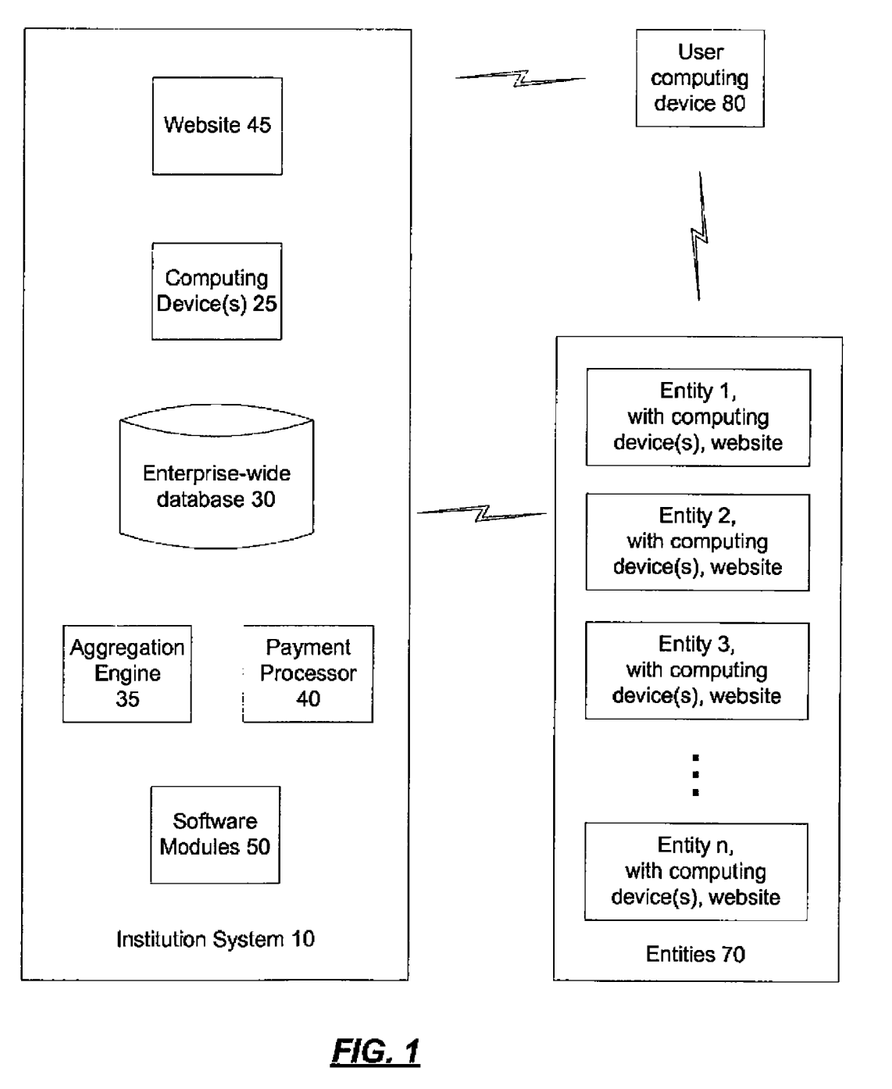
FIG. 1 is a block diagram of an implementation of a system that may be used with an automatic payment plan.

FIG. 1 is a block diagram of an implementation of a system that may be used with an automatic payment plan. An institution system 10, such as a system maintained by a financial services institution, may comprise one or more computing devices 25, an enterprise-wide database 30, an aggregation engine 35, a payment processor 40, a website 45, and software modules 50. A user may interact with the institution system 10 via a user computing device 80 over a network such as the Internet. An example user computing device is described with respect to FIG. 8.

The institution system 10 may be associated with entities 70, shown as entities 1 through n, in FIG. 1, where n is an integer greater than 1. Each of the entities 70 may be a business or a company, for example, which has an affiliation with the institution system 10. Examples of entities 70 include insurance companies, banks, investment companies, etc. In an implementation, each entity may include one or more computing devices that may connect to the institution system 10 and/or a user computing device 80 via a network, such as the Internet. An example computing device is described with respect to FIG. 8. The entities 70 may request and receive payments for a product or service provided to a user, for example, using data stored in the enterprise-wide database 30.

In an implementation, the institution system 10 may have a website 45 that a user, such as a member, customer, or prospective member or customer, may visit or log onto. Some or all of the entities 70 may each be accessible to a user through the institution website 45 and/or may have an associated website that a user may visit or log onto. Each website may have a user interface that allows a user to purchase products or services, receive bills, pay bills, transfer funds, and/or schedule payments or fund transfers, for example. The institution website 45 may be the website provided to the user regardless of whether the user logs into the institution system 10 or any of the entities 70. In this manner, the user may be presented with the same content regardless of which entity he logs into.

An enterprise-wide database 30 may contain user information that had been previously received and stored, e.g., with respect to a user's banking accounts or other funding sources. The enterprise-wide database 30 may be accessible by each of the entities 70. The enterprise-wide database 30 may store user data, such as identifiers and banking data, for example, associated with various user accounts. The user data may include data relating to institutional funding sources and data relating to external funding sources. Example funding sources include bank accounts, retirement accounts, brokerage accounts, and investment accounts, for example. Institutional funding sources may be one or more accounts maintained by the institution, and external funding sources may be one or more accounts maintained by a third party that is not associated with the institution.

In an implementation, the enterprise-wide database 30 can be accessed for various financial transactions, such as automatic payments, scheduled payments, one-time payments, and fund transfers, for example, from and between various banks, entities, and institutions.

In an implementation, an aggregation engine 35 may receive user data from various sources, such as the institutional funding sources, the external funding sources, and the user. This data may be collected by the aggregation engine 35 and stored in the enterprise-wide database 30. The data may be updated periodically. A payment processor 40 may be used to process and generate payments and transfer funds. These operations may use data that is stored in the enterprise-wide database 30.

The institution system 10 may also comprise one or more computing devices 25 that may operate in conjunction with software modules 50 and the enterprise-wide database 30, and may implement the aggregation engine 35 and the payment processor 40. An example computing device is described with respect to FIG. 8.

Software modules 50 are shown that may be used in the performance of the example techniques described herein in conjunction with other various elements and components described herein. Example software modules include modules for receiving and storing using data, processing payments, and transferring funds, described further herein. While specific functionality is described herein as occurring with respect to specific modules, the functionality may likewise be performed by more, fewer, or other modules. The functionality may be distributed among more than one module.

Each of the entities 70 may draw from one funding source using one set of user data. In this manner, various products and services that are not related to each other from various entities may be funded from the same source. For example, a life insurance payment, an auto loan payment, and a credit card payment may all be funded from a user's checking account, using the user's checking account data stored in the enterprise-wide database 30.

Figure 2:
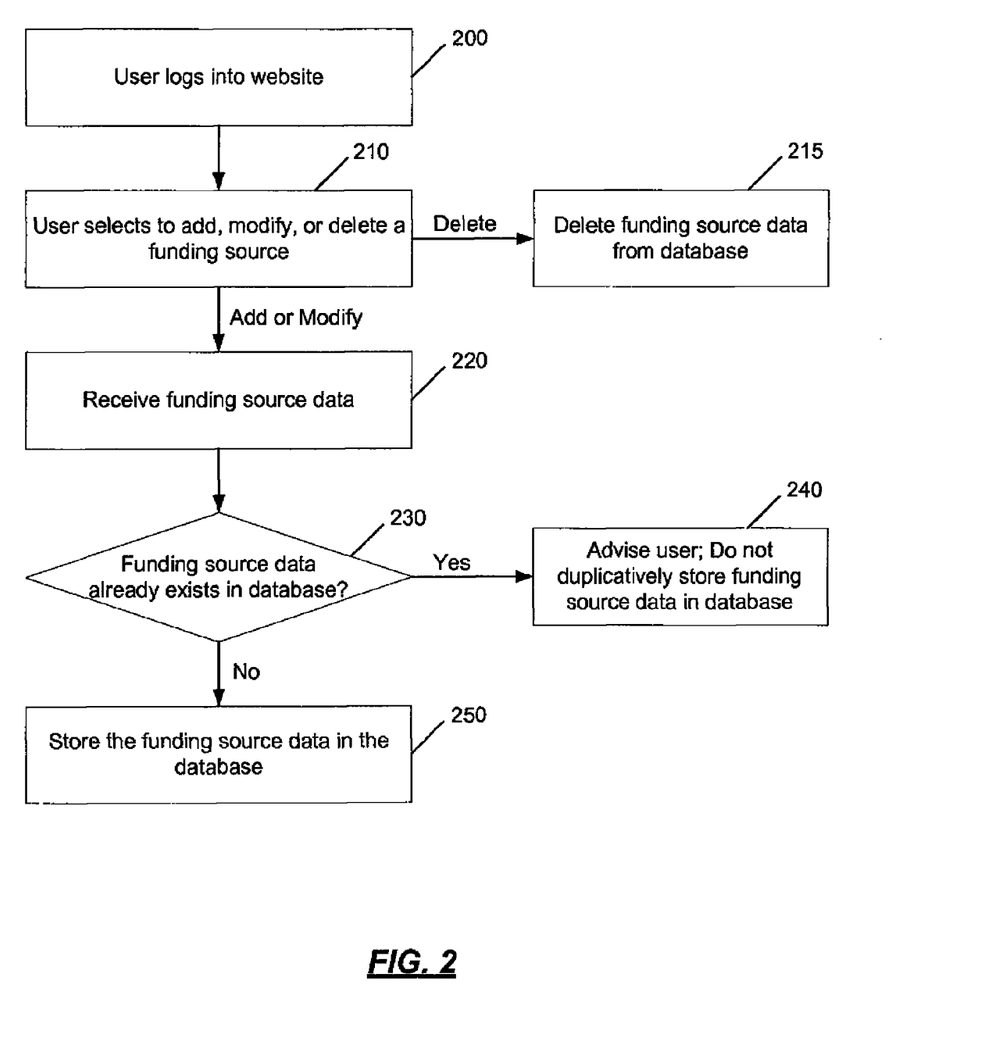
FIG. 2 is an operational flow of an implementation of a method of receiving user data.

FIG. 2 is an operational flow of an implementation of a method of receiving user data. At operation 200, a user logs into a website associated with any of the entities or the institution. In an implementation, the same website content may be provided to the user computing device for display for all of the entities and the institution, so that the same content is displayed to the user regardless of whether the user logged into a particular entity or the institution itself.

At operation 210, the user may select to add, modify, or delete a funding source, for example. If the user chooses to delete a funding source, then the user may do so, at operation 215. If the user chooses to add or modify a funding source, then the user may provide the appropriate funding source data for the selection, at operation 220. The funding source data may be received, collected, and analyzed by an aggregation engine, such as aggregation engine 35 of FIG. 1.

It may be determined, by the aggregation engine for example, if the data that is provided by the user is already stored in the enterprise-wide database, at operation 230. This may occur, for example, if the user is trying to add new funding source data, and that funding source data is already stored in the enterprise-wide database. If the funding source data is already stored in the enterprise-wide database, then the data may not be duplicatively stored in the database, and the user may be advised that the data is already stored, at operation 240. Otherwise, the data may be stored or updated in the enterprise-wide database, at operation 250. In an implementation, one set of the user's banking information and/or credit card information is stored in an enterprise-wide database, and may be modified as the user desires.

The funding source data, such as bank account information or credit card information, associated with the user may then be accessible across all products, services, and entities, upon the user's authorization. The user only has to provide the funding source data once and may then use that funding source to pay for any product, service, bill, etc. associated with any of the entities of the institution. A payment processor, such as payment processor 40 in FIG. 1, may facilitate the payment.

Thus, a user may update funding source data once, and this updated funding source data may then be available to all the entities. There is no need for the user to update the same funding source data separately for each entity. After providing account details for the user's various funding sources, a user can assign any of the funding sources to a payment or payment plan for any product or service provided by any entity of the institution.

Data that is provided by the user may be automatically received via the website and stored in an enterprise-wide database. A representative of the institution or entity may not have to manually enter user-provided data into a database associated with the institution or entity.

Figure 3:
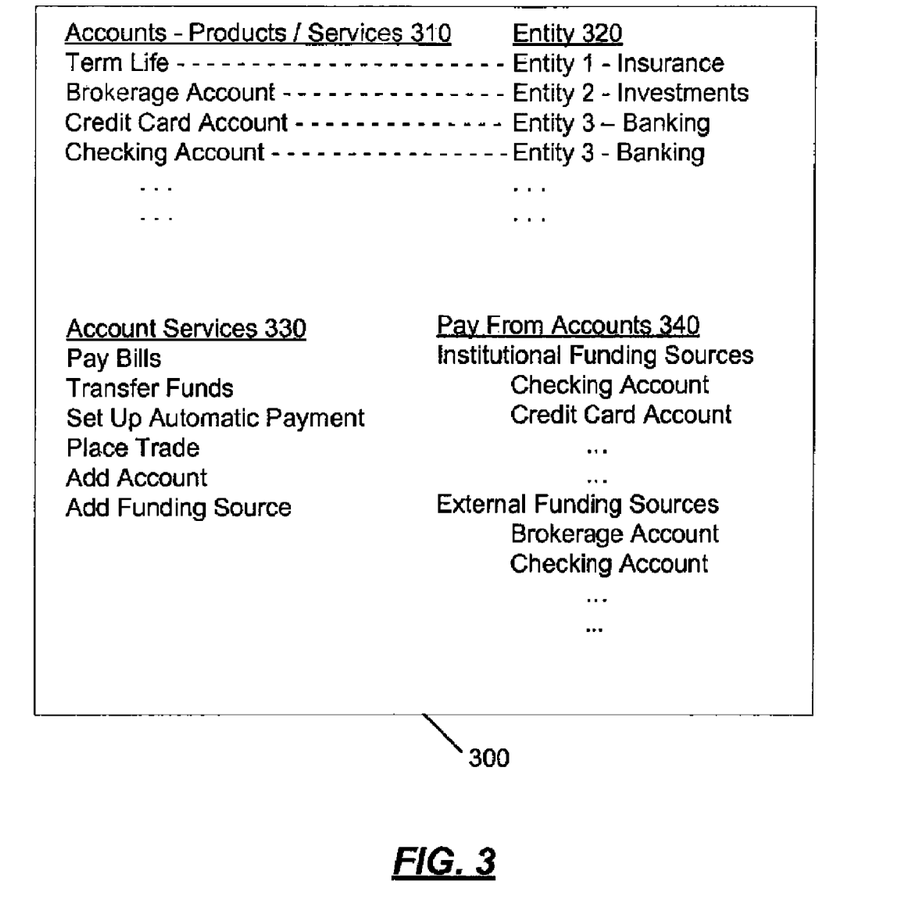
FIG. 3 is a diagram of an implementation of a page of content that may be used to receive user data.

An example page of content is shown in FIG. 3. In an implementation, an integrated view of the user's products and services 310 for the various entities 320 may be provided on a web page 300 that is displayed to the user via the user computing device. The user's products and services 310 may include a listing of accounts associated with the user such as "term life", "brokerage account", "credit card account", "checking account", "auto insurance policy", "health insurance", "homeowners policy", "mutual fund", etc. These accounts may be associated with the entities of the institution. The user may choose one of these products/services 310, e.g., by highlighting, clicking on, or otherwise selecting a desired product/service. After choosing the product/service, the user may then received detailed information about it, and take action against that product/service, such as paying a bill or setting up an automatic payment, described further herein.

A user may be presented with a listing of account services 330, such as "pay bills", "transfer funds", "set up automatic payment", "place a trade", "add account", "add funding source", etc., for example. The user may select actions associated with the listing of products/services 310, such as setting up automatic payments, paying a bill, or adding a funding source. After the user has selected one of these actions associated with account service 330, a listing of "pay from" accounts 340 may be displayed that have been created/added by the user. These pay from accounts may be institutional or external funding sources, such as checking accounts, credit card accounts, etc. The user may review these sources and select which of the sources is to be used in the payment process for a particular product or service.

Figure 4:
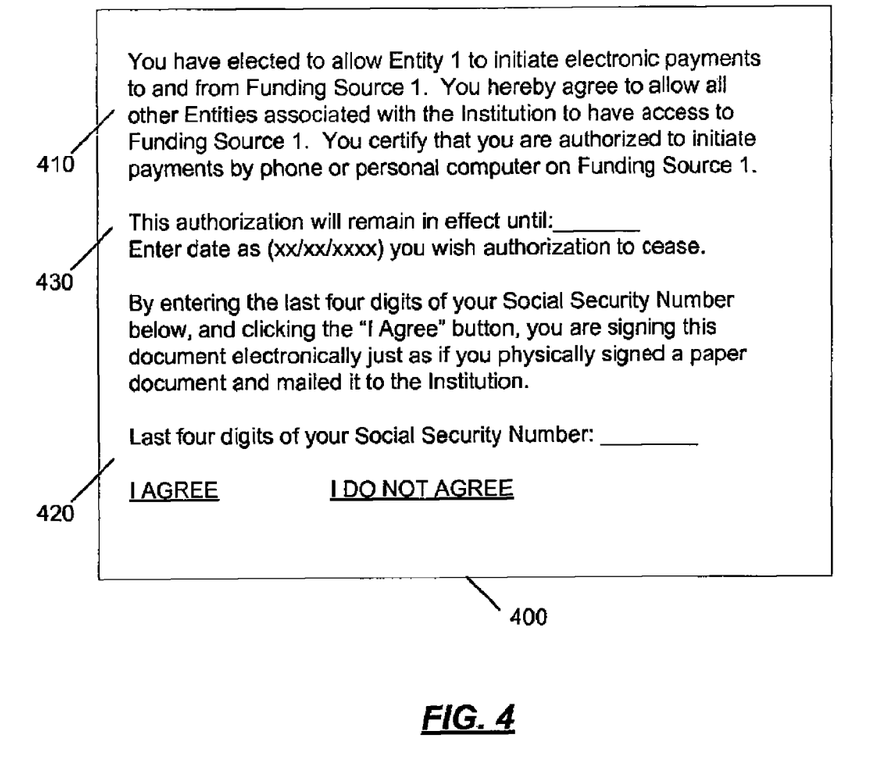
FIG. 4 is a diagram of an implementation of an authorization form.

In an implementation, an online authorization form, such as that shown in FIG. 4, is provided for the user to consider, select, and digitally sign or otherwise accept, that allows a user to authorize sharing of the user's funding source data among the entities. In an implementation, an online authorization form 400 may include language 410 directed to a user agreeing to allow a particular entity to initiate electronic payments to and from a particular funding source, and agreeing to grant access to the funding source to all entities associated with the institution. This is just one example, and additional or alternative language may also be used as desired by the institution.

In an implementation, an authorization form 400 may also include an area 420 where a user may digitally sign or otherwise agree to the terms of the authorization language 410. Any known technique for digital signature, verification, acceptance, or agreement may be used, such as providing the last four digits of a social security number and selecting an "I Agree" button on the authorization form 400.

In an implementation, a user may provide one or more limitations 430 on the authorization form 400 to the access of the user's data in the enterprise-wide database with the host financial institution. The access may be one-time, persistent, until a particular date (as shown in FIG. 4), for a limited duration (e.g., 6 months), for a limited amount (e.g., no funding over $1000 per charge), or for a limited number of transactions (e.g., no more than 5 transactions per month), for example.

Figure 5:
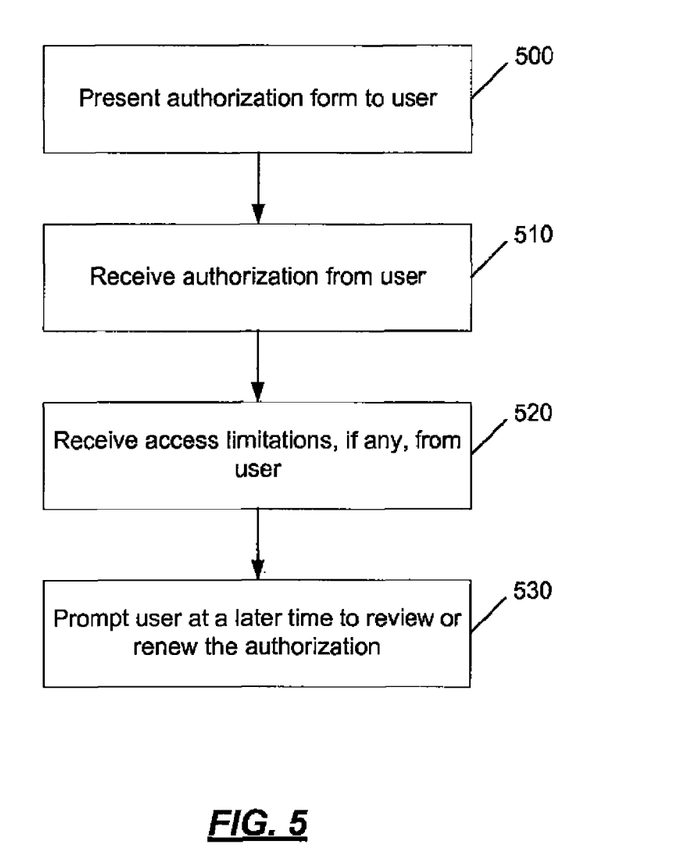
FIG. 5 is an operational flow of an implementation of a method of receiving user authorization to share funding source data among various entities.

FIG. 5 is an operational flow of an implementation of a method of receiving user authorization to share the user's funding source data among the various entities. At operation 500, the user is presented with an authorization form. The user may consider the language of the authorization form, and then authorize that any of the entities may access the user data, at operation 510. Authorization may be given by signature or another form of acceptance. An aggregation engine may collect and store this authorization in the enterprise-wide database or other storage device associated with the institution.

Any limitations to the access may be received from the user, at operation 520, and the access may then be set. Additionally, the user may be prompted periodically, by email, text message, phone, facsimile, or other alert or indicator, for example, to review or renew the authorization that the user had previously provided, at operation 530.

In this manner, any of the entities may be able to receive payment or funds from the funding sources associated with the user in the enterprise-wide database. In an implementation, if a user authorizes one entity to access the user's information in the enterprise-wide database, this authorization allows each entity to access the information pertaining to that user in the enterprise-wide database.

Figure 6:
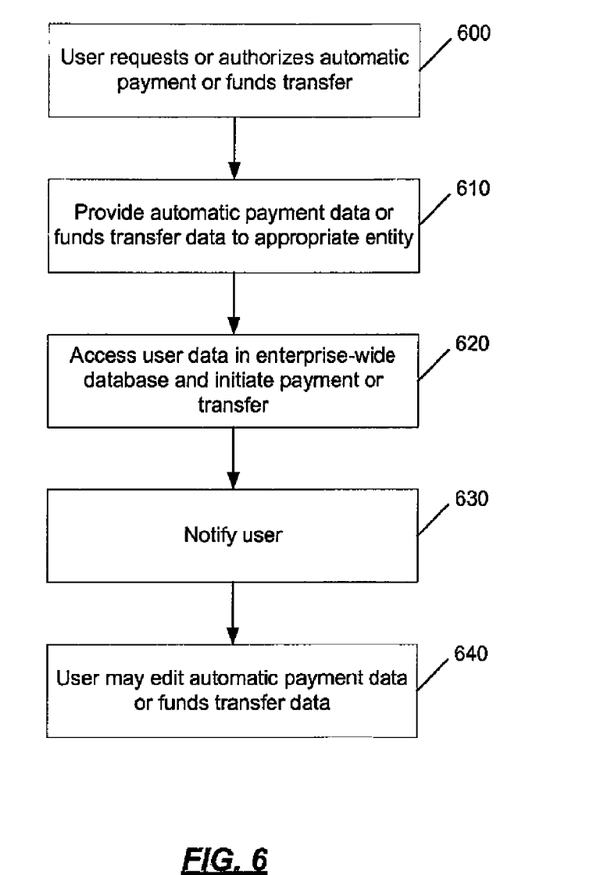
FIG. 6 is an operational flow of an implementation of a method of automatic payment or funds transfer.

In an implementation, a user may specify and set up, modify, or cancel automatic payments or funds transfer via a website associated with the institution or entities. FIG. 6 is an operational flow of an implementation of a method of automatic payment or funds transfer. At operation 600, a user requests or authorizes automatic payment or funds transfer to an entity, via the website.

In an implementation, the automatic payment data or funds transfer data may be provided to the appropriate entity that oversees the selected product, service, or account, at operation 610, and may be stored in the enterprise-wide database. At operation 620, at the appropriate time, the entity may access the user data in the enterprise-wide database, and may initiate the payment or funds transfer from the appropriate funding source, via a payment processor for example. The user may be notified at operation 630.

At some point, the user may wish to edit the automatic payment data or funds transfer data, and may do so via the website, at operation 640. For example, the user may change the funding source from which to draw the payments, without getting a service representative involved, or may change the dates on which the automatic payment is to be made. Alternatively, the user may cancel the automatic payments or funds transfers.

Figure 7:
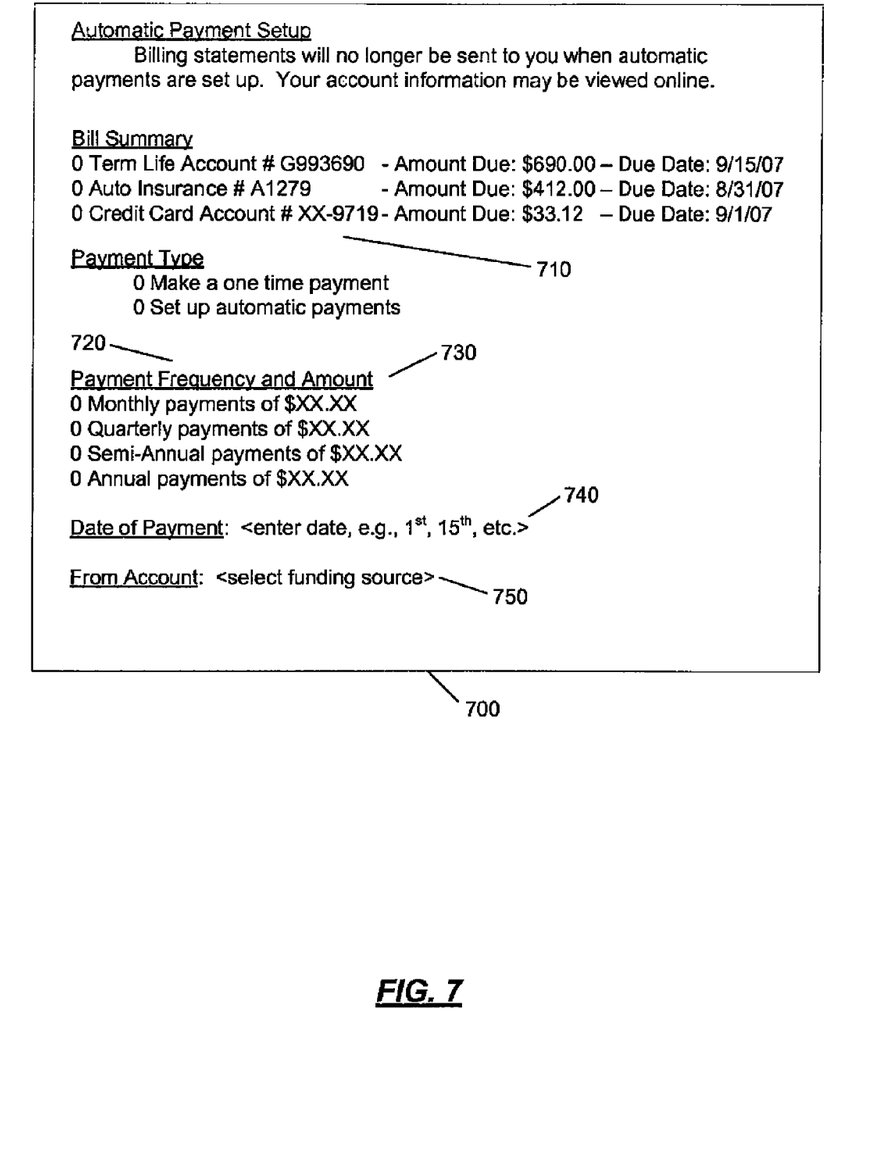
FIG. 7 is a diagram of an implementation of a page of content that may be used in the setup of automatic payments.

As shown in an example page of content of FIG. 7 directed to automatic payment set up, in an implementation, a list of user accounts 710 may be provided, such as a term life account, an auto insurance account, and a credit card account. For each user account, the list of user accounts 710 may include the account number, any amount due, and the payment due date. The list of user accounts 710 may show each user account for the entities of the institution. The user may choose one of the accounts by highlighting, clicking, or selecting a radio button, for example.

The user may choose to make a one time payment or set up automatic payments for the selected user account. If set up of automatic payments is selected, various payment frequencies 720 and corresponding amounts 730 may be displayed for user selection. The user may choose to have automatic payments made monthly, quarterly, semi-annually, or annually, for example.

The user may also select what date of the month 740 an automatic payment is to be made, such as the first date of the month or the fifteenth day of the month, for example. A list of available funding sources 750 may also be displayed to the user for selection. These funding sources may have been previously entered by the user and stored in the enterprise-wide database, or may be newly added, as described with respect to FIG. 2, for example. The user may choose which of the available funding sources 750 should be used to make the automatic payments. The funding source that the funds will be drawn from for the payment may be an account associated with the institution or its entities, or a third party account. It is contemplated that a similar page of content may be implemented for funds transfer.

Exemplary Computing Arrangement

Figure 8:
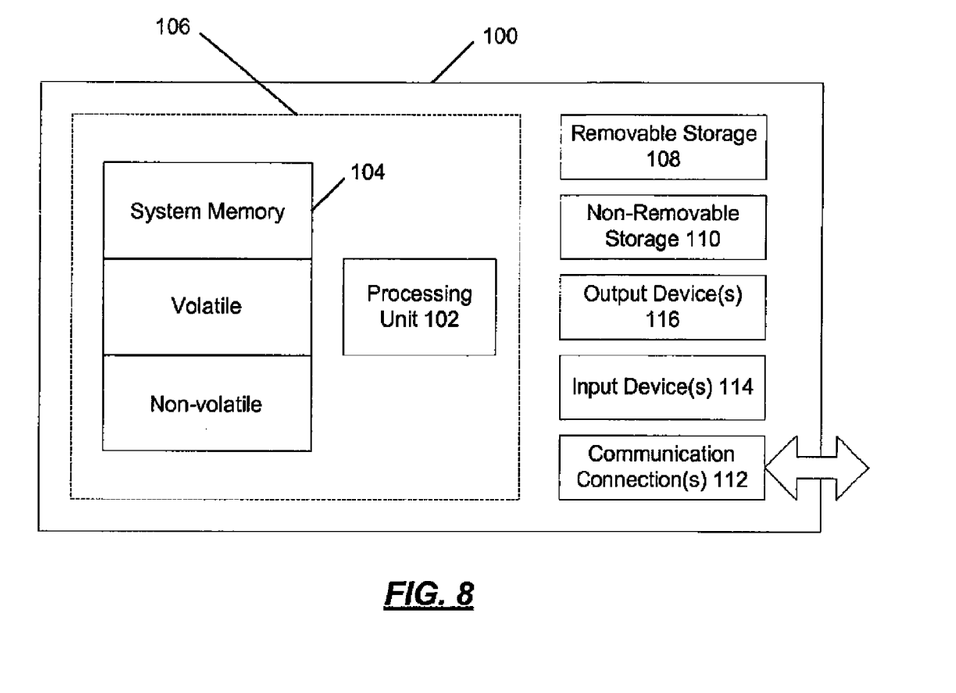
FIG. 8 is a block diagram of an example computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 8 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 8 by removable storage 108 and non-removable storage 110.

Computing device 100 typically includes a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, via a computing device, funding source data at an enterprise-wide database maintained by an institution, wherein the funding source data is accessible by a plurality of entities;
   determining, via the computing device, whether the funding source data is already in the enterprise-wide database;

in response to a determination that the funding source data is not in the enterprise-wide database, storing the funding source data in the enterprise-wide database;

in response to a determination that the funding source data is in the enterprise-wide database, not duplicatively storing the funding source data in the enterprise-wide database; and providing, via the computing device, the funding source data from the enterprise-wide database to one of the plurality of entities.

2. The method of claim 1, further comprising:

initiating, via the computing device, a payment of funds; and transferring the payment of funds, via the computing device, to the one of the plurality of entities based on the funding source data.

3. The method of claim 2, further comprising setting up an automatic payment to the one of the plurality of entities, via the computing device, wherein the transferring of the payment of funds is responsive to the automatic payment.

4. The method of claim 3, further comprising providing, via the computing device, automatic payment data to the one of the plurality of entities.

5. The method of claim 4 further comprising receiving, via the computing device, the automatic payment data from a member of the institution via a website of the institution.

6. The method of claim 1, wherein the plurality of entities is accessible to a member of the institution via a website of the institution.

7. The method of claim 6, further comprising:

receiving the funding source data from the member of the institution via the website of the institution; and receiving authorization from a member of the institution, via the website of the institution, to transfer a payment of funds.

8. The method of claim 6, further comprising presenting on the website of the institution a list of the member's accounts from each of the plurality of entities.

9. The method of claim 6, further comprising advising the member via the website of the institution that the funding source data was not duplicatively stored in the enterprise-wide database in response to the determination that the funding source data is in the enterprise-wide database.

10. A non-transitory computer-readable medium comprising computer-readable instructions executable by a processing resource to:

receive, at an enterprise-wide database maintained by an institution, funding source data associated with a member of the institution for a payment to one of a plurality of entities, the plurality of entities having access to the enterprise-wide database, and wherein the plurality of entities are accessible to the member through a website of the institution;

determine whether the funding source data is already in the enterprise-wide database;

in response to a determination that the funding source data is not in the enterprise-wide database, store the funding source data in the enterprise-wide database;

in response to a determination that the funding source data is in the enterprise-wide database, advise the member that the funding source data was not duplicatively stored in the enterprise-wide database;

provide the funding source data from the enterprise-wide database to the one of the plurality of entities;

initiate a payment of funds; and transfer the payment of funds to the one of the plurality of entities based on the funding source data associated with the member of the institution.

11. The non-transitory computer readable medium of claim 10, further comprising instructions executable to receive an authorization from the member for a single entity of the plurality of entities to access the funding source data, wherein the authorization for the single entity allows each of the plurality of entities to access the funding source data.

12. The non-transitory computer-readable medium of claim 10, wherein the institution is a financial services institution and the entities comprise at least one of an insurance company, a bank, and an investment company.

13. The non-transitory computer-readable medium of claim 10, wherein the funding source data comprises at least one of bank account data and credit card data.

14. The non-transitory computer-readable medium of claim 10, wherein the funding source data is associated with a funding source that comprises at least one of a bank account, a retirement account, a brokerage account, and an investment account.

15. A payment system, comprising:

a processing resource; and a memory resource coupled to the processing resource and storing thereon non-transitory computer readable instructions executable by the processing resource to:

receive funding source data at an enterprise-wide database maintained by an institution for a payment one of a plurality of entities, the plurality of entities having access to the enterprise-wide database, and being accessible to a member of the institution through an institution website;

determine whether the funding source data is already in the enterprise-wide database;

in response to a determination that the funding source data is not in the enterprise-wide database, store the funding source data in the enterprise-wide database and present on the website a list of the member's accounts from each of the plurality of entities;

in response to a determination that the funding source data is in the enterprise-wide database, advise the member that the funding source data was not duplicatively stored in the enterprise-wide database;

provide the funding source data from the enterprise-wide database to the one of the plurality of entities;

initiate a payment of funds; and transfer the payment of funds to the one of the plurality of entities based on the funding source data associated with the member of the institution.

16. The system of claim 15, wherein the computer readable instructions are executable by the processor to receive an authorization from the member of the institution for a single entity of the plurality of entities to access the funding source data.

17. The system of claim 15, wherein the computer readable instructions are executable by the processor to update the funding source data in response to a determination that a portion of the funding source data is in the enterprise-wide database.

18. The system of claim 16, wherein the computer readable instructions executable by the processor to receive an authorization from the member comprise instructions executable by the processor to received a limited authorization from the member.

19. The system of claim 15, wherein at least one of the plurality of entities is not associated with the institution.

* * * * *

UNITED STATES PATENT AND TRADEMARK OFFICE
CERTIFICATE OF CORRECTION

| | | Page 1 of 1 |
|---|---|---|
| PATENT NO. | : 8,744,962 B1 | |
| APPLICATION NO. | : 13/626202 | |
| DATED | : June 3, 2014 | |
| INVENTOR(S) | : Dennes et al. | |

It is certified that error appears in the above-identified patent and that said Letters Patent is hereby corrected as shown below:

In the Claims:

Column 10, Line 29, In Claim 15, delete "a payment one of a plurality of entities" and insert -- a payment to one of a plurality of entities --

Signed and Sealed this
Fourteenth Day of October, 2014

Michelle K. Lee
*Deputy Director of the United States Patent and Trademark Office*